US006616098B2

United States Patent
Mills

(10) Patent No.: US 6,616,098 B2
(45) Date of Patent: Sep. 9, 2003

(54) MID-LEVEL DECK FOR PASSENGER AIRCRAFT

(75) Inventor: Christopher J. Mills, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/928,401

(22) Filed: Aug. 13, 2001

(65) Prior Publication Data

US 2003/0029967 A1 Feb. 13, 2003

(51) Int. Cl.[7] .............................................. B64D 11/04
(52) U.S. Cl. ................... 244/118.5; 244/118.1; 244/129.6
(58) Field of Search ........................ 244/118.5, 118.6, 244/118.1, 119, 129.6; 105/329.1, 340

(56) References Cited

U.S. PATENT DOCUMENTS

| | | | | | |
|---|---|---|---|---|---|
| 4,055,317 A | * | 10/1977 | Greiss | ...................... | 244/118.5 |
| 4,066,227 A | * | 1/1978 | Buchsel | ...................... | 105/340 |
| 5,474,260 A | * | 12/1995 | Schwertfeger et al. | ... | 244/118.5 |
| 6,003,813 A | * | 12/1999 | Wentland et al. | ......... | 244/118.5 |
| 6,073,883 A | | 6/2000 | Ohlmann et al. | ......... | 244/118.5 |
| 6,182,926 B1 | * | 2/2001 | Moore | ...................... | 244/118.5 |
| 6,237,872 B1 | | 5/2001 | Bar-Levav | ............... | 244/118.6 |

* cited by examiner

Primary Examiner—Michael J. Carone
Assistant Examiner—Gabriel S Sukman
(74) Attorney, Agent, or Firm—Harness Dickey & Pierce P.L.C.

(57) ABSTRACT

A mid-level deck is provided as part of a main passenger cabin of a commercial aircraft and includes an elevated platform between the cabin floor and ceiling to provide additional storage space and areas for use by crew members. The mid-level deck also facilitates access to overhead modules. The storage space is provided under the elevated platform for storing galley carts, bins or similar storage items. A plurality of different articles may be provided in conjunction with the mid-level deck and/or connected to the elevated platform, including extra seats, storage members and sleeping units. More than one mid-level deck may be provided within a single main passenger cabin and and/on different levels of an aircraft.

14 Claims, 6 Drawing Sheets

MID-LEVEL DECK FOR PASSENGER AIRCRAFT

FIELD OF THE INVENTION

The present invention relates generally to commercial passenger aircrafts, and more particularly to an elevated area providing additional space within the main cabin of a commercial passenger aircraft.

BACKGROUND OF THE INVENTION

Efficient use of space within a commercial passenger aircraft in order to maximize storage and seating area is extremely important. Not only can more efficient use of the space increase the number of passengers transported per flight, but having the capability to store more items on board provides for a more enjoyable flight for both passengers and crew. For example, and particularly with respect to long flights, having additional space to store food or larger items, and/or for crew members to rest or relax, not only can increase the overall flight experience for passengers (e.g., more snacks or variety of food), but makes the flight easier for crew members (e.g., more private space to rest).

In larger aircrafts (e.g., Boeing® 747®) that are typically used for longer flights, overhead space modules, such as crew rest stations and additional storage compartments, are provided in the space between the curved top portion of the hull of the aircraft and the lowered ceiling of the aircraft. This space is generally very limited in size and provides limited access and movement. For example, crew members accessing this area often have difficulty maneuvering within the space and the small overhead crew rest stations for sleeping are often uncomfortable. Crew members can only sleep in these areas and are not provided with enough space to perform any useful tasks. Further, crew members must typically congregate in the galley area of the cabin to interact. When passengers are sleeping, it is oftentimes difficult to converse without disturbing those that are sleeping. Further, storage of larger items within the cabin is virtually impossible.

With respect specifically to general storage, galley cart storage and access to individual galley carts in most commercial aircrafts is difficult and time consuming. Galley carts not stored in a galley area are typically stored in upper and/or lower lobe compartments of the aircraft, which results in an inability to quickly and efficiently access the carts. In particular, extra galley carts are typically provided on longer flights and cannot be stored in the galley area because of limited storage space. Conveyor systems for accessing the galley carts are provided, but are relatively complex, making jamming or a malfunction more likely. Thus, extra time and effort is required to access the galley carts and to fix problems. Further, this space could otherwise be used for cargo storage.

Overhead space modules are also provided and typically include single function spaces because of the limited access to these areas. Thus, use of the overhead space is limited to a specific function. These overhead space modules are not easily accessible, and most often are accessed through a narrow and steep stairway, and an alternate egress path/hatch or exit platform in the event that the primary ingress/egress path is blocked. The need to provide access using an emergency exit platform not only adds complexity in design, but increases the weight and cost of the aircraft.

Thus, in present commercial passenger aircrafts, not only is certain overhead space for use by crew members inconvenient and difficult to access, but storage for larger items and areas for crew members are limited.

SUMMARY OF THE INVENTION

Larger commercial passenger aircrafts, including for example, the Boeing® 747® and 777® aircrafts include a cross section having space for providing various features (e.g., sleeping modules) in the overhead area above the main cabin ceiling. These areas are typically provided on aircrafts having the capability for long range flights, thus requiring additional service items (e.g., food and accompanying galley carts) and attendants, as well as an additional pilot and crew. Efficient use of the overhead space, as well as maximizing use of space within the main cabin of these aircrafts is particularly important.

The present invention provides a mid-level deck elevated above the floor and below the ceiling in the main cabin of a commercial passenger aircraft. The mid-level deck provides convenient access to overhead areas (e.g., space modules), extra storage areas, additional space for use by crew members, which may include, for example, larger areas for resting and sleeping, and additional passenger accommodations.

Specifically, the mid-level deck of the present invention in the main cabin of a commercial passenger aircraft includes an elevated platform having a storage area thereunder and a plurality of steps for accessing the elevated platform. Steps may also be provided to access an overhead portion having space modules. Additional steps may be provided for alternate access to the elevated platform. Connection members may be provided to secure items to the elevated platform (e.g., additional seats for crew members). Further, storage units adapted for connection to the elevated platform may be provided. The storage units (e.g., bins) may be convertible for providing an alternate sleeping area for crew members. Storage compartments or similar members also may be provided above the elevated platform connected to the mid-level deck or the crown of the aircraft for use in storing items (e.g., personal items of the crew members).

The elevated platform may be configured such that a view of the exterior windows of the main cabin is provided, or alternately, may be concealed within the main cabin. Further, the elevated platform is adapted for mounting within the main cabin to existing tracks used to mount passenger seats. More than one mid-level deck may be mounted within the main cabin and on different levels of the aircraft.

The storage area under the elevated platform is configured according to the specific aircraft requirements, for example, to accept a predetermined number of galley carts. A conveyor may be provided in connection with the storage area for accessing the galley carts. Direct access from a galley to the storage area for ease in storing galley carts may also be provided.

Thus, the mid-level deck of the present invention provides a simple and easily configurable area having additional space for use by crew members and/or passengers, as well as maximizing storage areas and facilitating access to overhead areas (e.g., elimination of emergency exit platform). Not only is access to overhead modules and galley carts easier, but flexibility in designing the main cabin of these aircrafts is increased.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to a mid-level deck having a specific configuration for use in particular aircrafts, it is not so limited, and the mid-level deck may be modified according to the principles of the present invention for use in any type of aircraft with different configurations.

Generally, a mid-level deck (MLD) constructed according to the principles of the present invention comprises a platform or floor space raised above the main passenger cabin floor a desired distance (e.g., preferably approximately 45 inches) that provides storage area thereunder, a platform on and above which items may be attached, and easier access (i.e., ingress and egress) to overhead space modules. For example, an MLD of the present invention may be used in connection with other overhead space utilization features to maximize the available space inside a Boeing® 777® aircraft.

Figure 1:
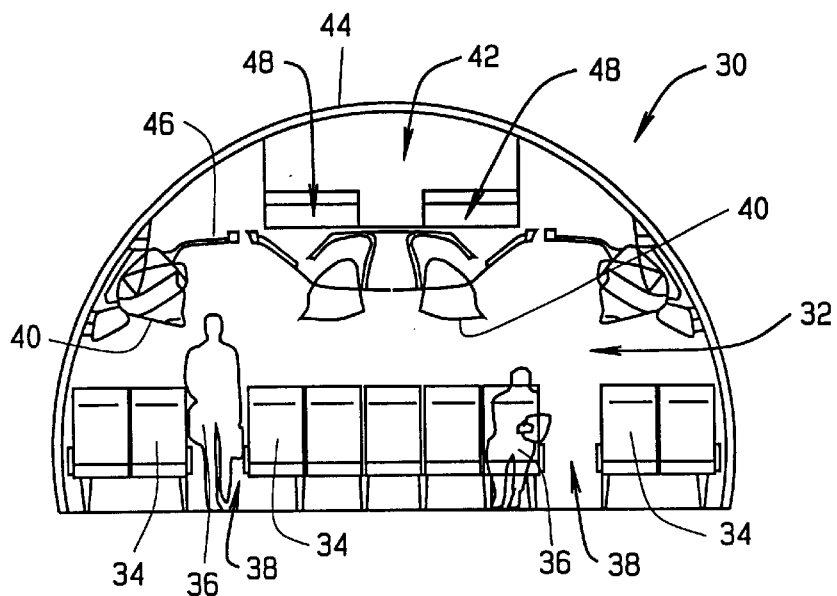
FIG. 1 is a partial cross-sectional view of a main passenger cabin of a commercial aircraft.
Figure 2:
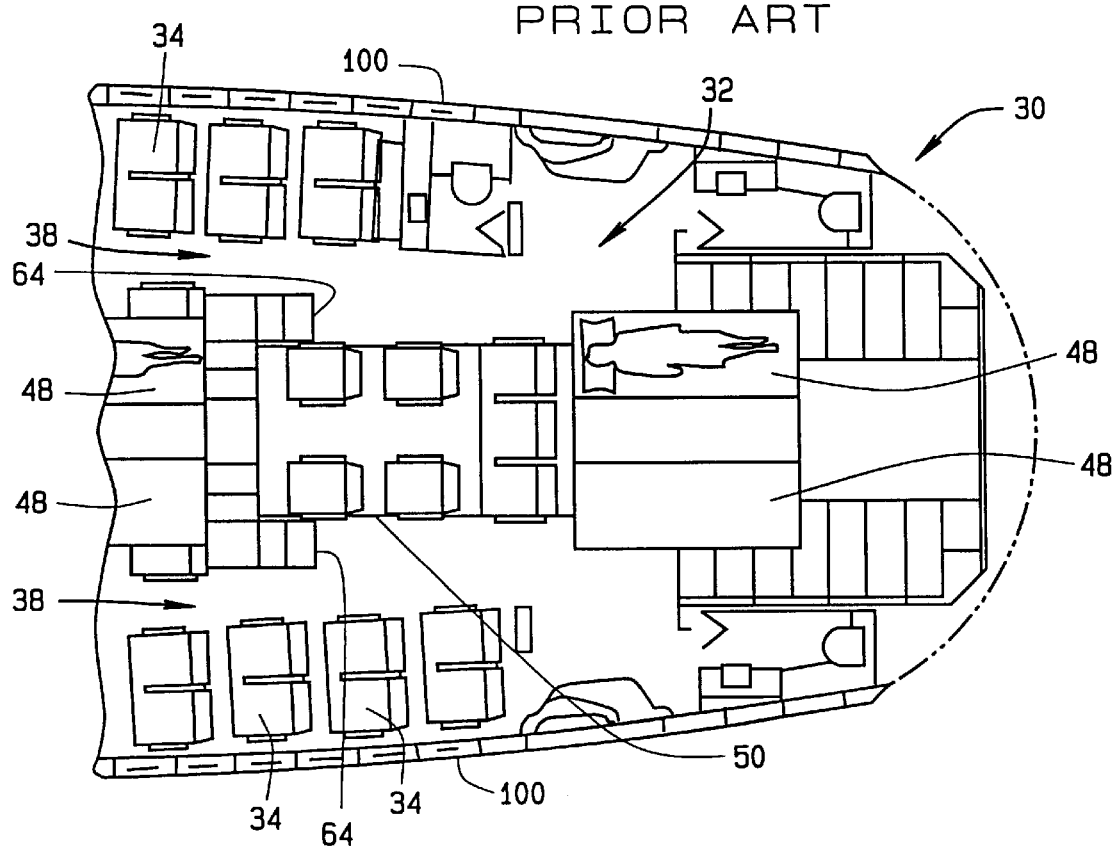
FIG. 2 is a top plan view of a portion of a main passenger cabin of a commercial aircraft.

In commercial passenger aircrafts, and in particular, larger aircrafts used for long distance flights, such as the Boeing® 777® aircraft shown in FIG. 1, and indicated generally by reference numeral 30, a main passenger cabin 32 includes a plurality of passenger seats 34 for use by passengers 36. The Boeing® 777® aircraft as shown is configured such that two aisles 38 are provided for passage through the main passenger cabin 32 by passengers 36 and crew 76. Overhead storage compartments or bins 40 are provided for storage of passenger items during flight. Passengers 36 may also store items below the seat 34 in front of their seat 34.

An overhead area 42 between the crown 44 or curved top portion of the hull of the aircraft 30 and the ceiling 46 of the main cabin may include overhead space modules 48 (e.g., sleeping compartments). As shown in FIG. 1, the overhead area 42 is limited in space, even in a larger aircraft.

Referring to FIGS. 2 through 6, an MLD 50 in accordance with a preferred embodiment of the present invention is shown. The MLD 50 includes an elevated platform 52, which is preferably configured such that it is raised a predetermined distance (e.g., 45 inches) above the main cabin deck 54 to accommodate storage of storage members, including, for example, galley carts 56 thereunder in a storage portion 58. Other items also may be stored in the storage portion 58, such as, for example, a garment bag 53. The storage portion 58 is preferably accessible directly from a galley 60 through a pass-through door 62 or other opening on a back wall 63 of the MLD 50. Further, the dimensions of the storage portion 58 and elevated platform 52 are configured to accommodate storage of a predetermined number of storage units, such as, for example, a predetermined number of galley carts 56 or stow bins. A conveyor or similar system (not shown) may be provided for accessing the galley carts 56.

Figure 4:
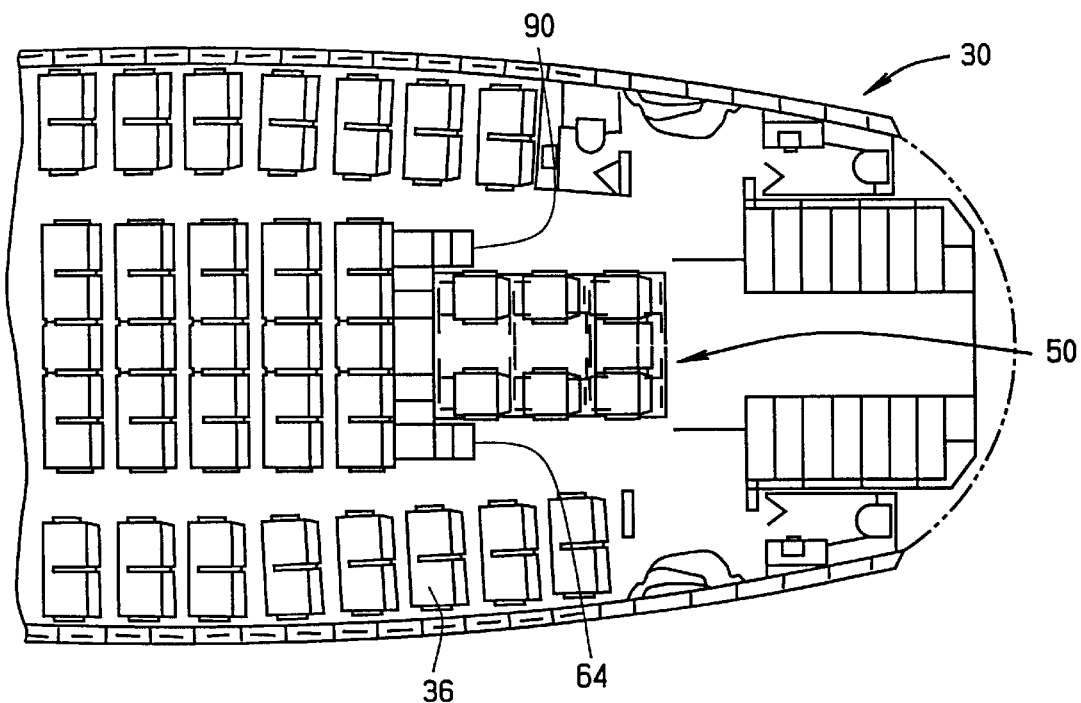
FIG. 4 is a top plan view of a portion of a main passenger cabin of a commercial aircraft having the mid-level deck of the invention therein.
Figure 8:
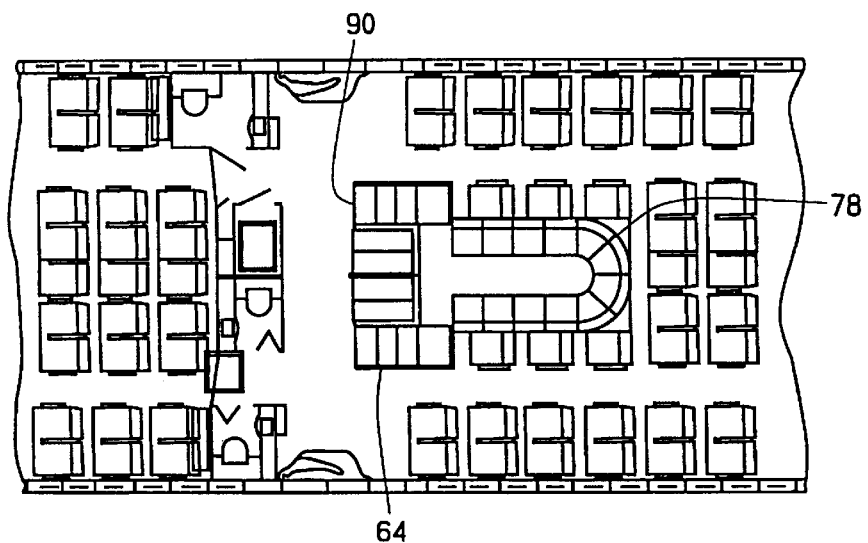
FIG. 8 is a top plan view of a portion of a main passenger cabin of a commercial aircraft having an alternate construction of the mid-level deck of the present invention therein.

The elevated platform 52 is accessed from the main cabin 32 using a plurality of steps 64. Access to the overhead area 42 may also be provided by a plurality of steps 66. It should be noted that depending upon the requirements (e.g., seating requirements) of the main cabin 32 of the specific aircraft, the plurality of steps 64, 66 may be provided in different configurations. Further, the plurality of steps 64, 66 may be provided as a single unit, and additional steps 90 may provide alternate access to the elevated platform 52 as shown in FIGS. 4 and 8. The plurality of steps 64, 66 may be provided in any known manner, including as an integrated part of the main cabin 32, as part of a ladder, or in any suitable manner.

Figure 5:
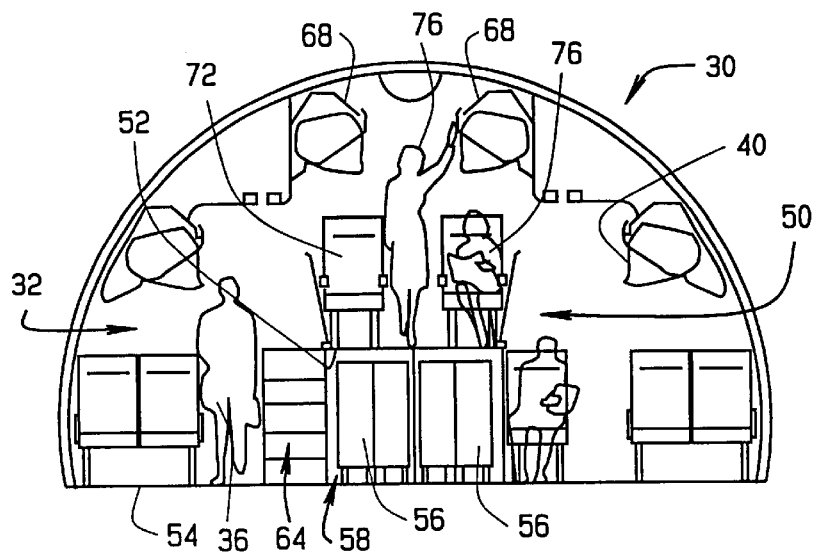
FIG. 5 is a partial cross-sectional view of a main passenger cabin of a commercial aircraft having the mid-level deck of the present invention therein.
Figure 6:
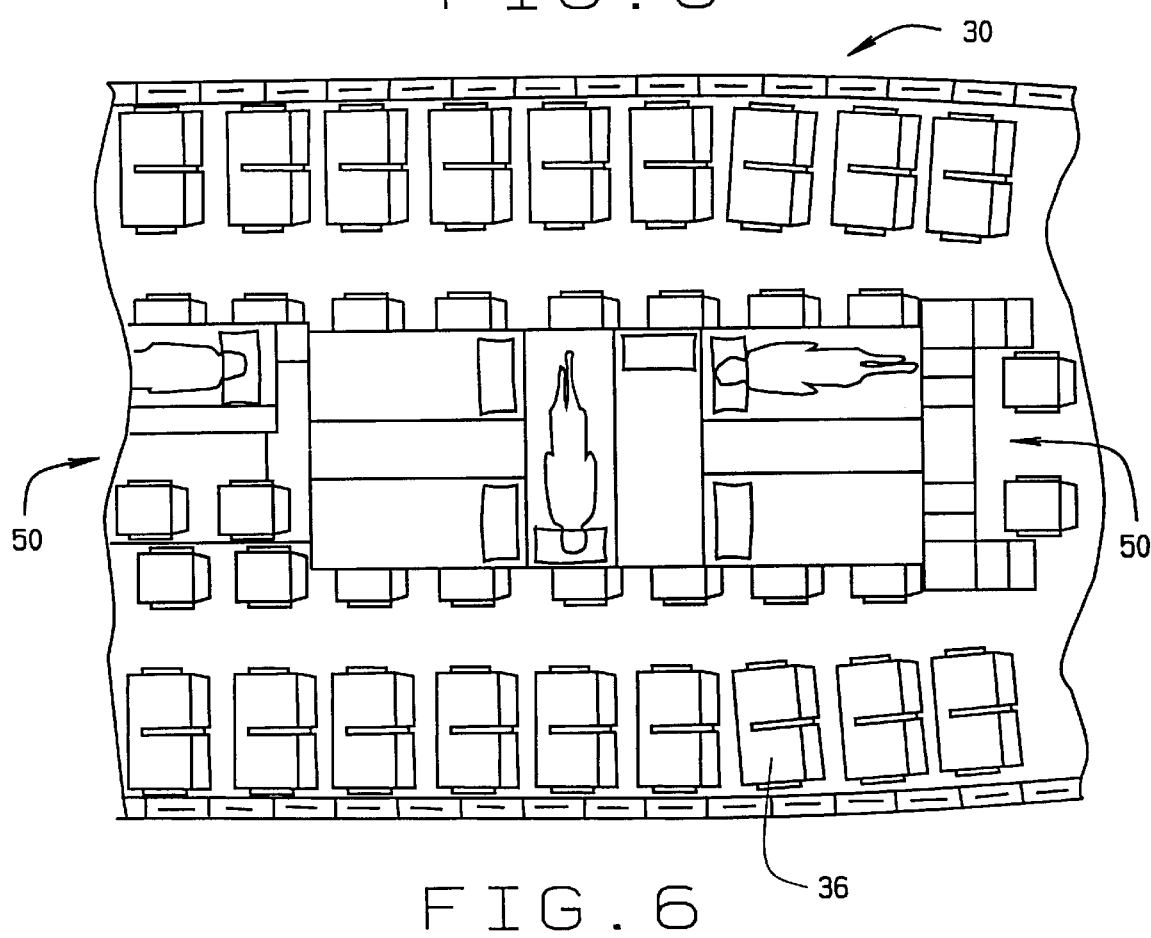
FIG. 6 is a top plan view of a portion of a main passenger cabin of a commercial aircraft having overhead modules and two mid-level decks of the present invention.
Figure 11:
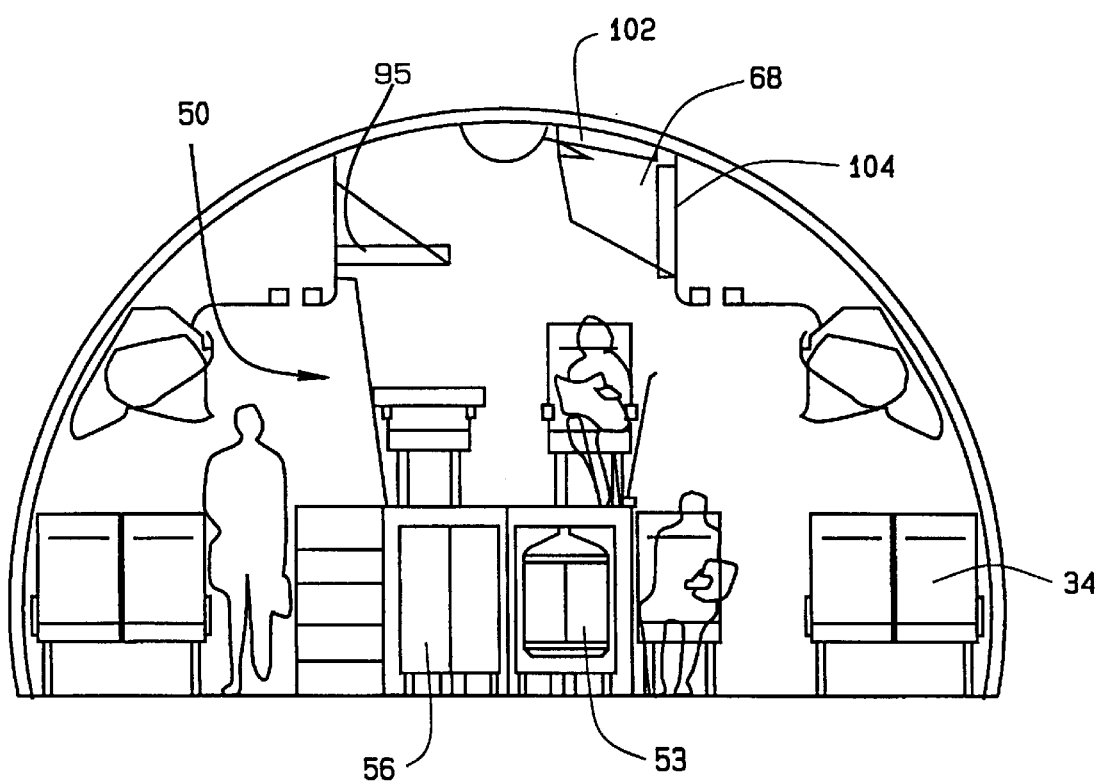
FIG. 11 is a partial cross-sectional view of a main passenger cabin having a mid-level deck with convertible bins of the invention therein.

Referring specifically to FIG. 5, in one preferred construction, overhead compartments or bins 68 may be provided for additional storage and are accessed using the elevated platform 52. For example, crew members 76 using the MLD 50 may store personal items in these compartments or bins 68. These compartments or bins 68 may be convertible to sleeping units 95 (e.g., bunks) as shown in FIG. 11. Alternately, in order to provide more overhead space for movement, and as shown in FIG. 3, the MLD 50 may be provided with an open overhead area 70 thereabove (i.e., no overhead compartments or bins 68).

Figure 3:
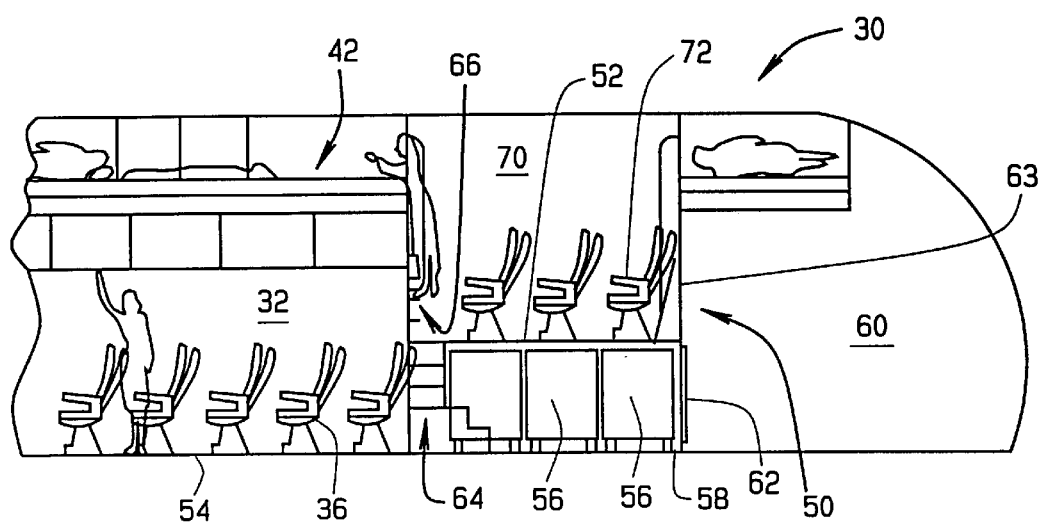
FIG. 3 is a side elevation view of a portion of a main passenger cabin having a mid-level deck constructed according to the principles of the present invention therein.

With respect to alternate constructions of the MLD 50, and for example as shown in FIGS. 3 and 5, different articles or members, including seats 72 may be provided in connection with the elevated platform 52 for use by crew members 76. It should be noted that passengers 36 may also use the seats 72. The seats 72 are preferably connected to the elevated platform 52 using seat tracks as are known. As shown in FIGS. 7 through 10, different configurations or seating arrangements may also be provided in connection with the elevated platform 52. For example, as shown in FIG. 8, a lounge-type or curved sectional seating arrangement 78 may be provided, or as shown in FIG. 10, a work-station type configuration having work areas 80 with desks 82 may be provided.

Figure 7:
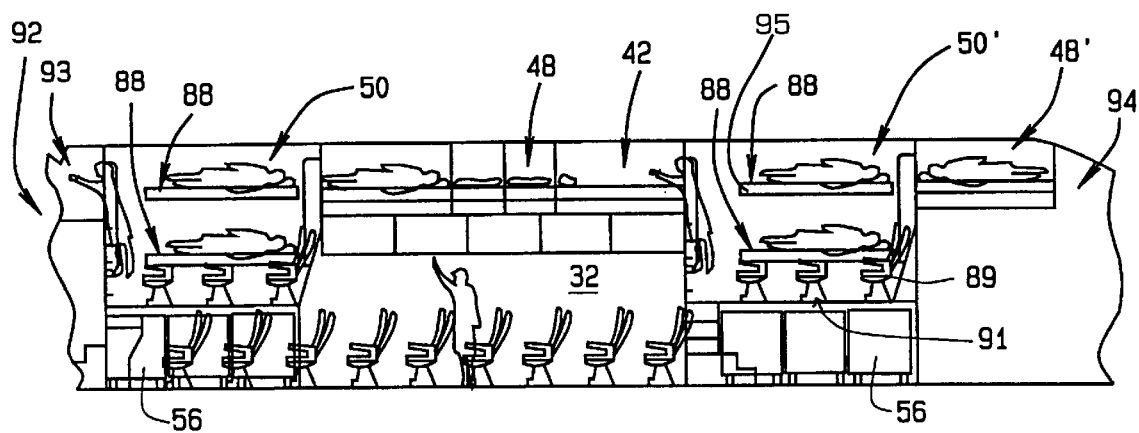
FIG. 7 is a side elevation view of a portion of a main passenger cabin of a commercial aircraft having a plurality of mid-level decks of the present invention therein.
Figure 9:
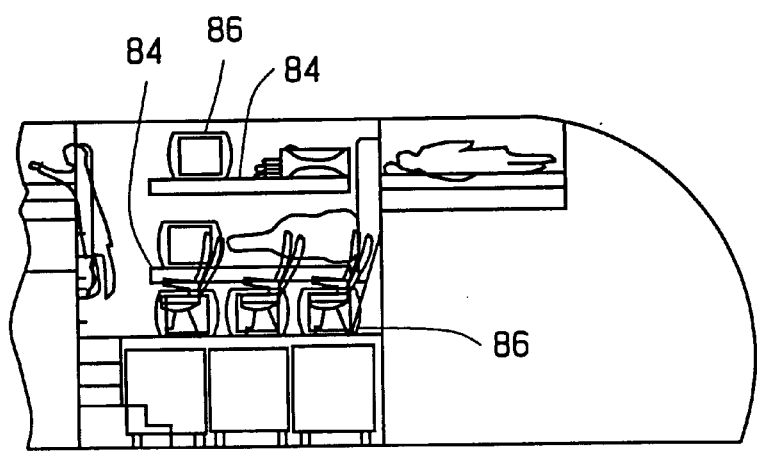
FIG. 9 is a side elevation view of a portion of a main passenger cabin of a commercial aircraft having another alternate construction of the mid-level deck of the present invention therein.
Figure 10:
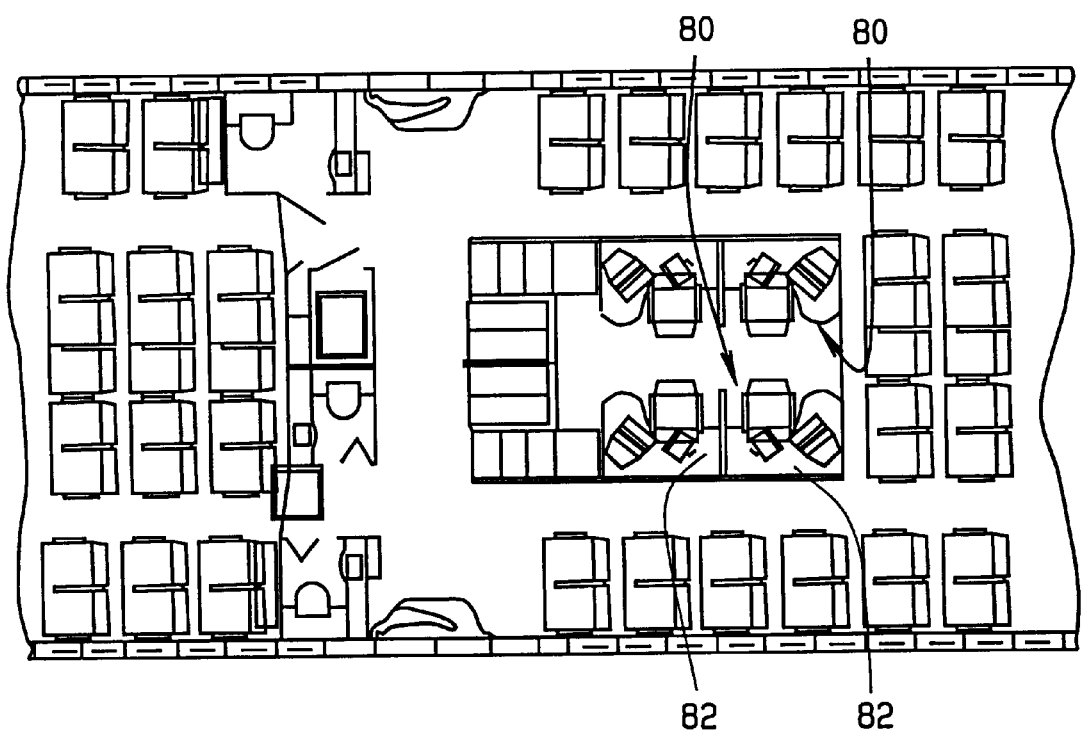
FIG. 10 is a top plan view of a portion of a main passenger cabin of a commercial aircraft having another alternate construction of the mid-level deck of the present invention therein.

Alternately, and as shown in FIG. 9, additional storage shelves 84 may be provided for storing larger items 86, such as, for example, travel cages for animals. In another embodiment, as shown in FIG. 7, additional sleeping areas or surfaces 88 may be provided in connection with the MLD 50. The additional sleeping areas or surfaces 88 may be provided as an integrated part of the MLD 50, as part of adjustable members 89, which may include, for example, fully reclineable seats 91 or removable seats, and/or as storage compartments or bins 68 capable of being converted to a sleeping unit 95 (e.g., a pair of beds) as shown in FIG. 11. The storage compartments or bins 68 as shown in FIG. 11 provide additional sleeping areas 88 as sleeping units 95 when lowered from a stored position. The stored position may be adjacent to the crown 44 of the aircraft 30, indicated in this position at 102, or in a vertical position indicated at 104. When in the stored position, access is provided to the storage compartments or bins 68.

More than one MLD 50 may be provided within the main cabin 32 as shown in FIG. 7. The MLD 50, including the elevated platform 52, is mounted to the main cabin floor 54 in any known manner, including for example bolting to the main cabin floor 54. Preferably, the MLD 50 and associated elevated platform 52 are mounted to the main cabin floor 54 using existing seat tracks and seat track fittings provided therein for installing passenger seats 34 within the main cabin 32. Additionally, support members may be provided in connection with the elevated platform 52 in any known manner to further support its raised position. For example, these support members may be provided as a tie-rod mid wall, which would also provide access to the storage area 58 from both sides of the MLD 50. Additional storage areas may be provided adjacent to an MLD 50 if needed, including, for example, storage areas for attendant luggage and garment bags.

Thus, multiple MLDs 50 may be provided as part of an aircraft 30, such as a Boeing® 777® aircraft. For example, and referring again to FIG. 7, two MLDs 50 are provided in conjunction with three overhead space modules in a portion of a Boeing® 777® aircraft. Specifically, and as shown therein, starting from the fore 92 of the aircraft 32, and moving to the aft 94 of the aircraft, the following are provided:

(1) An above monument Purser work station or closet 93;

(2) A first MLD 50;

(3) A 6 bunk overhead attendant rest space module 48;

(4) A second MLD 50'; and (5) A two bunk overhead attendant rest space module 48'.

It should be noted that as configured in FIG. 7, a total of twenty-four galley carts 56 can be stored under the two MLDs 50.

Thus, an MLD 50 of the present invention may be constructed in alternate configurations to thereby provide different functions. For example, this may include providing in connection with an MLD 50 any of the following:

(1) Passenger seats 34

(2) Attendant seats 72

(3) Sleeping areas 88 including attendant bunks (4) Combination of seats/bunks (5) Full height attendant changing area having an open overhead area 70

(6) Business center having work areas 80

(7) Emergency medical bunk (8) State room (9) Lounge 78

(10) Accommodate non-standard size storage items 86

Depending upon the requirements of the specific aircraft 30, an MLD 50 and accompany component parts may be constructed and provided as required.

It should be noted that each MLD 50 may be provided with different levels of privacy within the main passenger cabin 32. Thus, for example, an MLD 50 may be constructed to provide individuals (e.g., crew members 76) seated on the MLD 50 with a direct view of exterior windows 100 of the aircraft 30, thereby having an open space environment. Alternately, the MLD 50 may be separated (i.e., concealed) from the main passenger cabin 32 to thereby provide a more private space.

Thus, an MLD 50 constructed according to the principles of the present invention provides extra space for use by crew members, while maximizing storage and facilitating access to overhead areas 42. Further, flexibility in main passenger cabin 32 design is increased and may be easily modified depending upon the requirements of the specific airline.

Although the present invention has been described in connection with specific modules and components for use with an MLD 50 having specific configurations, it should be appreciated that additional or alternate modules and components may be provided in connection or as part of an MLD 50 of the present invention having different configurations. Further, an MLD 50 is not limited for use by crew members 76, but may be used by passengers 36 of the aircraft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mid-level deck for a main cabin of a passenger aircraft, the mid-level deck comprising:

an elevated platform above a floor of the main cabin providing access to an overhead portion of the main cabin and adapted for securedly attaching articles thereon, the overhead portion including a plurality of modules;

a plurality of steps configured as a first set of steps for accessing the elevated platform and a second set of steps for accessing the plurality of modules; and said elevated platform forming a storage area for providing storage under the elevated platform.

2. A mid-level deck for a main cabin of a passenger aircraft, the mid-level deck comprising:

an elevated platform above a floor of the main cabin providing access to an overhead portion of the main cabin and adapted for securedly attaching articles thereon; and said elevated platform forming a storage area for providing storage under the elevated platform, and wherein the floor of the main cabin includes a plurality of tracks for mounting passenger seats and the elevated platform is adapted for connection to the plurality of tracks.

3. A mid-level deck for a main cabin of a passenger aircraft, the mid-level deck comprising:

an elevated platform above a floor of the main cabin providing access to an overhead portion of the main cabin and adapted for securedly attaching articles thereon;

a plurality of steps providing access to the elevated platform;

a plurality of alternate steps for accessing the elevated platform; and said elevated platform forming a storage area for providing storage under the elevated platform.

4. A mid-level deck for a main cabin of a passenger aircraft, the mid-level deck comprising:

an elevated platform above a floor of the main cabin providing access to an overhead portion of the main cabin and adapted for securedly attaching articles thereon;

a plurality of seating members attached to the elevated platform; and said elevated platform forming a storage area for providing storage under the elevated platform.

5. A mid-level deck for a main cabin of a passenger aircraft, the mid-level deck comprising:

an elevated platform above a floor of the main cabin providing access to an overhead portion of the main cabin and adapted for securedly attaching articles thereon;

a plurality of storage units attached to the elevated platform and configured for conversion to sleeping units; and said elevated platform forming a storage area for providing storage under the elevated platform.

6. A mid-level deck for a main cabin of a passenger aircraft, the mid-level deck comprising:

a plurality of elevated platforms above a floor of the main cabin providing access to an overhead portion of the main cabin and adapted for securedly attaching articles thereon, each provided separately within the main cabin; and said elevated platform forming a storage area for providing storage under the elevated platform.

7. The mid-level deck according to claim 6 wherein the plurality of platforms are adapted to be provided on separate levels of the passenger aircraft.

8. A mid-level deck for a main cabin of a passenger aircraft, the mid-level deck comprising:

an elevated platform above a floor of the main cabin providing access to an overhead portion of the main cabin and adapted for securedly attaching articles thereon; and said elevated platform forming a storage area for providing storage under the elevated platform and wherein the elevated platform is configured such that exterior windows of the main cabin are visible from the elevated platform.

9. A passenger aircraft with a main cabin having at least one seating area, the passenger aircraft comprising:

a mid-level deck within the at least one seating area elevated above a floor of the main cabin and having a storage area thereunder, and adapted for accessing an overhead portion above a ceiling of the main cabin.

10. The passenger aircraft according to claim 9 further comprising a plurality of steps for accessing the mid-level deck and the overhead portion.

11. The passenger aircraft according to claim 9 wherein the mid-level deck further comprises securing members for attaching articles to the mid-level deck.

12. The passenger aircraft according to claim 9 further comprising convertible storage units adapted for connection to the mid-level deck and configured in a first position for storage and in a second position as a sleeping unit.

13. The passenger aircraft according to claim 9 further comprising seat tracks on the floor of the main cabin for securing passenger seats within the at least one seating area, and wherein the mid-level deck is adapted for mounting to the seat tracks.

14. A method of increasing the available space for use within a main cabin of a passenger aircraft, the method comprising the steps of:

providing an elevated platform above a floor of the main cabin for accessing an overhead space above a ceiling of the main cabin;

providing a storage area below the elevated platform;

connecting articles to the elevated platform, wherein the articles include convertible storage units; and converting the storage units to sleeping units.

* * * * *